March 29, 1966   D. A. WELLS   3,242,849
SYNCHRONOUS DOUBLE AUTOMATIC FRYER

Filed Jan. 31, 1964   3 Sheets-Sheet 1

INVENTOR.
DONALD A. WELLS
BY Naylor & Neal
ATTORNEYS

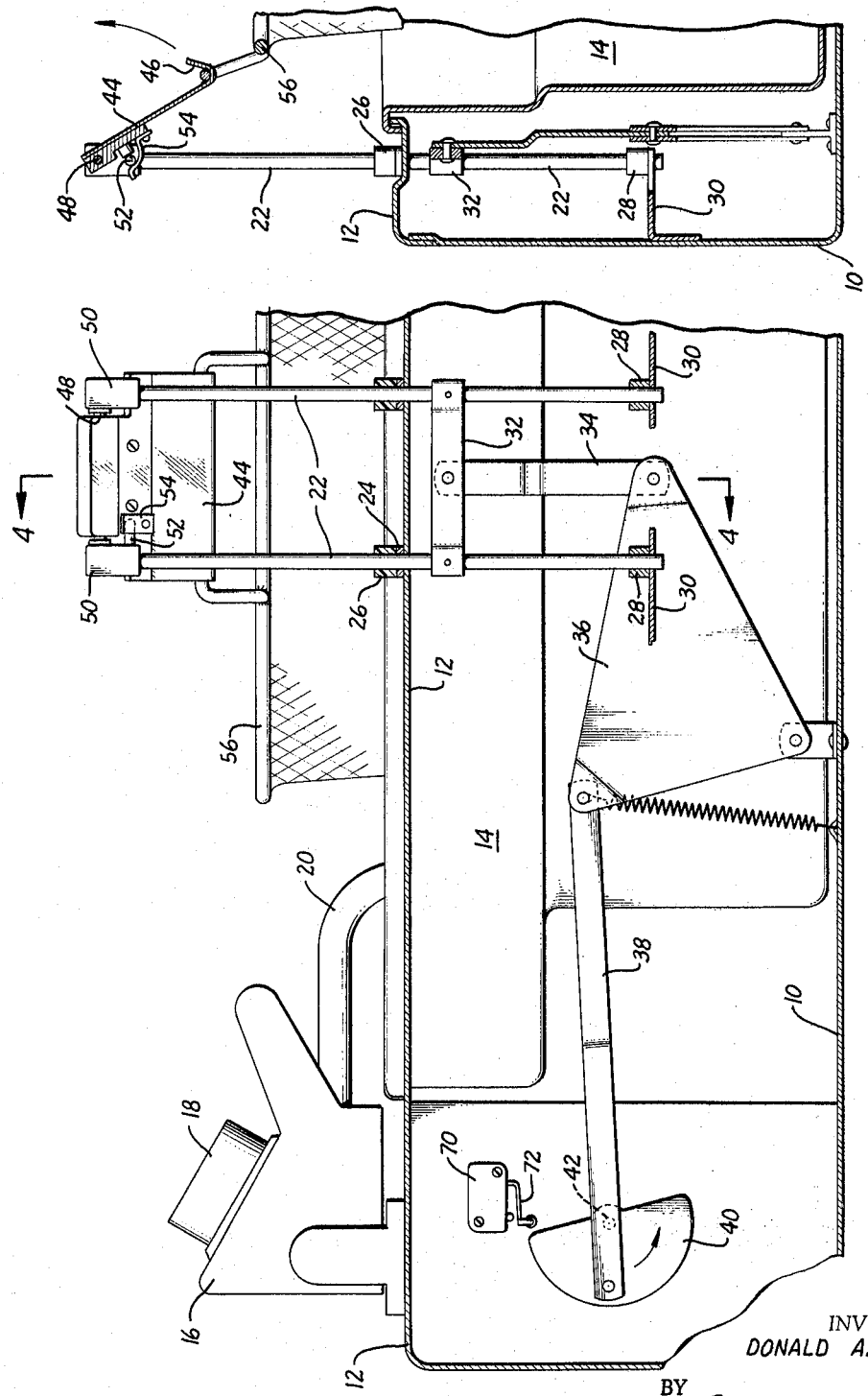

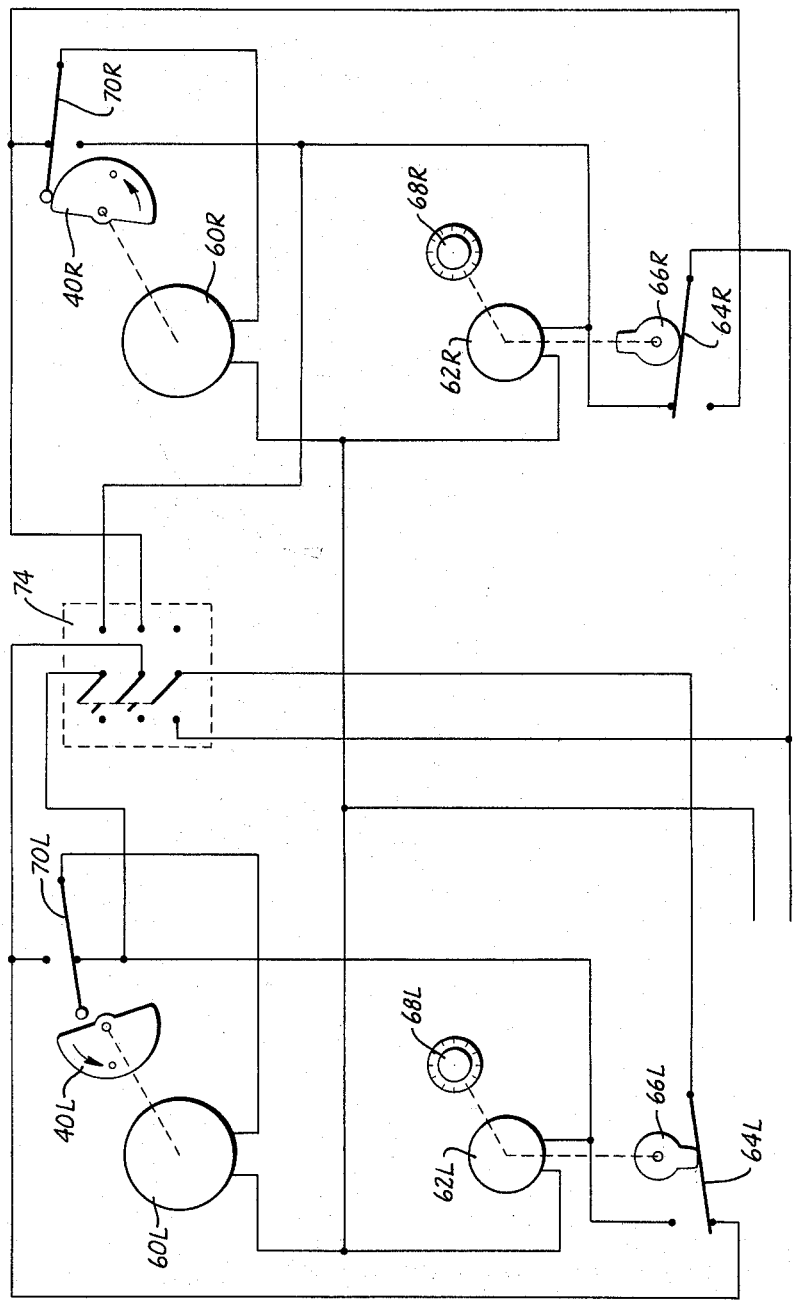

United States Patent Office 3,242,849
Patented Mar. 29, 1966

3,242,849
SYNCHRONOUS DOUBLE AUTOMATIC FRYER
Donald A. Wells, 27 Catalpa, Atherton, Calif.
Filed Jan. 31, 1964, Ser. No. 341,718
7 Claims. (Cl. 99—411)

This invention relates to cooking machines and more particularly to deep fat fryers.

In the use of deep fat fryers, it is very desirable to have a deep fat fryer which is adapted to be used in different ways. Thus, as explained in my copending application, Serial No. 211,601, filed July 23, 1962, now abandoned, it is very desirable for a restaurant operator to have a single deep fat fryer which can be used at one time to prepare several small batches of the same or different foods and can be used at other times to prepare single large batches of a single food. For instance, it may be necessary during the day to cook small batches of fried potatoes or fried shrimp while at the time of the evening meal it may be desirable to cook whole chickens and the like.

In my copending application I have shown a deep fat fryer designed for such multiple use, and this invention provides an improvement over my earlier application in that I have now provided a deep fat fryer which not only is capable of multiple use, but also is capable of fully automatic operation in all of its conditions of use.

The deep fat fryer of this application employs two sets of cooking basket units which may be used alternatively. One set includes a pair of small baskets which are used side by side in the apparatus for cooking small batches of food, and the other set consists of a single large basket in which large batches or large items of food may be cooked. Support and control means are provided for each of the small baskets of the first basket unit so that each of the baskets can be raised and lowered automatically and independently into one or more baths of heated fat, and means are provided for coupling the two separate supporting control means together so that they are operable in synchronization to jointly raise and lower the large basket into a bath of fat.

The double use automatic deep fat fryer of this invention can be made very simply and economically and may be manufactured efficiently employing component parts which are otherwise useable in single automatic deep fat fryers.

Other features and advantages of the invention will become apparent from the following description read in conjunction with the attached drawings in which:

FIG. 3 is a vertical sectional view through the apparatus of FIG. 1 taken along the plane indicated at 3—3 in FIG. 1;

FIG. 4 is a vertical section taken along the plane indicated at 4—4 in FIG. 3, and FIG. 5 is a schematic diagram of the control circuit for the deep fat fryer of FIG. 1.

Figure 1:
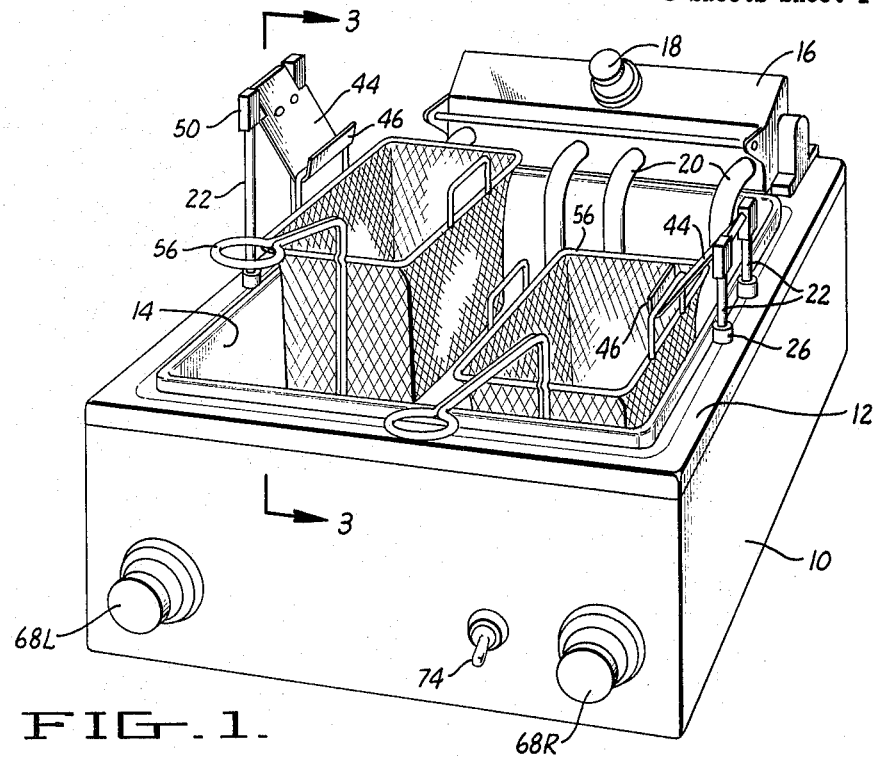
FIG. 1 is a perspective view of a deep fat fryer constructed in accordance with this invention illustrating a pair of small baskets in use in the apparatus.

Referring now in detail to the drawings and particularly to FIG. 1, the deep fat fryer illustrated therein includes a housing 10 having a top wall 12 with an open top tank 14 mounted in the top wall 12 of the housing. A control panel 16 is pivotally mounted on top of the housing 10 and carries a temperature control dial 18 and electrical conductor tubes 20 which extend downwardly into the tank 14 and support electrical heating elements (not shown) in the bottom of the tank. The control panel 16 may be rotated upwardly to swing the heating elements out of the tank so that the tank 14 may be removed from the housing for cleaning and the like. The tank 14 may be replaced by auxiliary tank units as mentioned in my copending application to provide separate cooking tanks for the two small baskets, and alternatively a removable divider wall may be inserted into the tank to divide the tank into two compartments for the two small baskets.

A pair of lifting arms 22 is provided adjacent to each of the opposite side walls of the tank 14 with each of the arms mounted for vertical sliding motion in the housing 10. As illustrated in FIG. 3, each of the arms 22 is slidably mounted in a socket 24 provided with a fluid seal 26 in the top wall 12 of the housing and is also slidably mounted in a lower guide 28 on a bracket 30 within the housing. A crossbar 32 interconnects the two lift arms 22 of each pair, and each of the crossbars 32 is connected by a link 34, rocker 36 and link 38 to a cam crank 40. The crank 40 is rotatably mounted in the housing 10 on an axle 42 which is rotated by means not shown which are connected to a unidirectional electric motor.

As explained in detail hereinafter, the crank 40 is rotated by the electric motor to reciprocate the lift arms 22 up and down to raise and lower food baskets out of and into the tank 14.

A basket hanger 44 having a lower hook portion 46 is pivotally mounted between the upper ends of the lift arms 22 of each pair, the hanger 44 carrying a pivot pin 48 (FIG. 4) which is pivotally received in a cap 50 on the top of each of the rods 22. A stop pin 52 engaging a latch spring 54 is mounted on one of the caps 50 for holding the hanger 44 in its basket receiving condition illustrated in FIG. 4 while permitting the hanger to be pivoted upwardly in the direction indicated by the arrow in FIG. 4 when it is desirable to remove the tank 14 from the housing.

As illustrated in FIG. 1, a pair of small foraminous baskets 56 may be hung individually on the pair of hangers 44 so that the small baskets 56 may be raised and lowered in the tank 14 independently by the hangers 44 responsive to independent rotation of the cranks 40 at opposite sides of the housing. In this regard it will be noted that the lifting apparatus illustrated in FIGS. 3 and 4 for the left hand basket 56 of FIG. 1 is a mirror image of duplicate lifting apparatus provided at the right hand side of the housing 10 for lifting the right hand basket 56 in FIG. 1.

Figure 2:
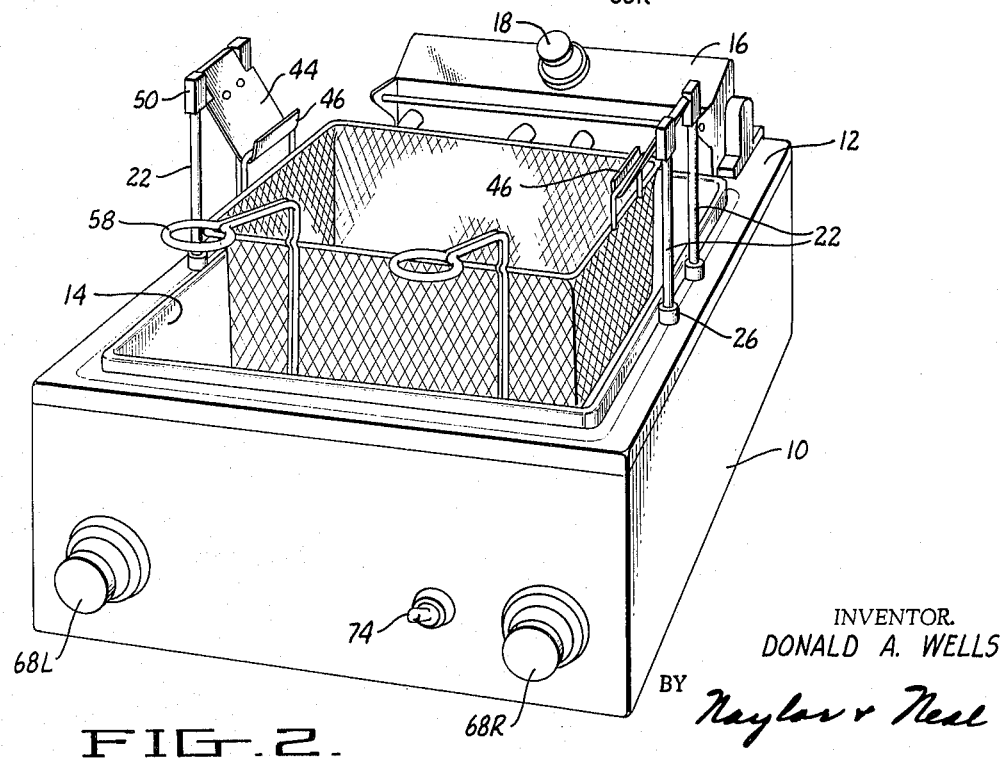
FIG. 2 is a perspective view of the deep fat fryer of FIG. 1 illustrating the fryer in use with a single large basket.

When the two hangers 44 are simultaneously in their upper and lower positions and when they are moved between these positions in synchronization, the two hangers may jointly support a single large basket 58 as illustrated in FIG. 2. Control means are provided for rotating the two cranks 40 either independently or in synchronization with each other so that the hangers 44 can be raised and lowered independently for the operating condition shown in FIG. 1 or alternatively the two hangers 44 can be raised and lowered in synchronization for the operating arrangement illustrated in FIG. 2.

This control means is illustrated in FIG. 5 where the left and right control elements are designated by subscripts "L" and "R." Each of the cam cranks 40 is connected to a unidirectional electric motor 60 by which the cam crank is rotated, and an electric interval timer motor 62 is connected to a timer switch 64 for controlling the time interval during which either of the hangers 44 is to be in its lower position. The combination of timer motor 62 and switch 64 is a conventional timing mechanism in which the timer switch 64 is controlled by a cam 66 to support the switch 64 in an "off" position (shown at 64 "L") when the timer is in its "0" time position and to support the switch 64 in its "on" position (shown at 64 "R") when the timer is moved away from its "0" time position. A timer control knob 68 (see also FIG. 2) is connected to each of the switch operating cams 66 to pre-set the time interval during which the switch 64 is to be maintained in its "on" position. The timer control knob 68 is also connected to the timer drive motor 62 so that the cam 66 and timer control knob 68 are returned to their "0" time positions by the timer motor in a time interval which is proportional to the pre-set position of the timer knob 68.

A limit switch 70 (see also FIG. 3) is positioned adjacent to each of the cranks 40 to sense the position of the crank and hence the position of the associated basket hanger 44. The crank 40 has a peripheral cam surface extending through one hundred and eighty (180) degrees on which the limit switch arm 72 (FIG. 3) rides with the limit switch positioned as indicated in FIG. 3 so that the switch arm 72 moves off of the cam 40 when the basket hanger 44 reaches its upper position and so that the cam engages the switch arm 72 when the basket hanger 44 moves into its lower position.

The switches 64 and 70 are connected to the respective timer motors 62 and lift motors 60 as illustrated in FIG. 5 so that the operation of each motor 60 to lower and then raise its basket hanger 40 may be controlled independently by the corresponding timer knob 68.

The two control circuits for the motors 60 "L" and 60 "R" are interconnected by a three pole, double throw switch 74 (see also FIGS. 1 and 2) by which the control circuits for the two motors 60 "L" and 60 "R" may be converted between the two operating conditions illustrated in FIGS. 1 and 2. With the arms of the switch 64 in their left hand position illustrated in FIG. 5, the two motors 60 "L" and 60 "R" are controlled independently by the timer knobs 68 "L" and 68 "R" respectively. The circuit components of FIG. 5 are illustrated in this condition with the left hand control circuit illustrated as it supports its basket hanger 44 in the upper position and with the right hand circuit shown as it is timing the time interval during which the right hand basket hanger is in its lower position; in this regard, FIG. 5 and FIG. 1 illustrate the same operating condition.

When the arms of the switch 64 are moved from the left hand position to the right hand position, the timer motor 62 "L" and timer switch 64 "L" are disconnected from effective operation in the left hand circuit, and the timer motor 62 "R" and timer switch 64 "R" are connected to the left hand circuit to control operation of the left hand circuit in synchronization with the right hand circuit.

While one specific embodiment of this invention has been illustrated and described in detail above, it is obvious that many modifications thereof may be made without departing from the spirit and scope of the invention.

I claim:
1. In a cooking machine for cooking food in a bath of heated fat while said food is supported in a basket,
   (A) an open top tank for containing a bath of heated fat,
   (B) first and second basket support means mounted adjacent to said tank on opposite sides of a central vertical plane through said tank with said basket support means movable between upper and lower positions, and
   (C) control means connected to said basket support means for moving said basket support means between upper and lower positions with said control means having conversion means for converting said control means between
      (1) an independent control condition for moving said first and second basket support means between said positions independently of each other and
      (2) a concurrent control condition for moving said first and second support means between said positions in synchronization with each other.
2. A deep fat fryer comprising
   (A) an open top tank for containing a bath of heated fat,
   (B) a foraminous basket adapted to be received in said tank to support a quantity of food while said food is cooked in said tank,
   (C) first and second support means mounted adjacent to said tank on opposite sides of a central vertical plane through said tank with said basket support means movable between upper and lower positions and jointly supporting said basket for lowering said basket into said tank and raising said basket out of said tank, and
   (D) control means connected to said basket support means for moving said basket support means between said upper and lower positions with said control means having conversion means for converting said control means between
      (1) an independent control condition for moving said first and second basket support means between said positions independently of each other and
      (2) a concurrent control condition for moving said first and second support means between said positions in synchronization with each other.
3. A deep fat fryer comprising
   (A) an open top tank for containing a bath of heated fat,
   (B) first and second support means mounted adjacent to said tank on opposite sides of a central vertical plane through said tank and movable between upper and lower positions for lowering baskets into said tank and raising baskets out of said tank,
   (C) a first basket unit having a single foraminous basket adapted to be mounted on said first and second support means for support jointly by said first and second support means with said single basket having a horizontal cross sectional area greater than one-half of the horizontal cross sectional area of said tank,
   (D) a second basket unit having a pair of foraminous baskets adapted to be mounted on said first and second support means concurrently with each of said baskets supported individually by one of said first and second support means independently of the other of said baskets, and
   (E) control means connected to said basket support means for moving said basket support means between said upper and lower positions with said control means having conversion means for converting said control means between
      (1) an independent control condition for moving said first and second basket support means between said positions independently of each other, and
      (2) a concurrent control condition for moving said first and second support means between said positions in synchronization with each other.
4. In a cooking machine for cooking food in a bath of heated fat while said food is supported in a basket,
   (A) an open top tank for containing a bath of heated fat,
   (B) first and second basket support means mounted adjacent to said tank on opposite sides of a central vertical plane through said tank,
   (C) first and second lift means connected respectively to said first and second support means for raising and lowering said support means between upper and lower positions,

(D) first and second timer control means connected respectively to said first and second lift means for operating said lift means independently of each other while controlling the time intervals during which each of said lift means remains in its lower position, and (E) selectively operable coupling means interconnecting said first control means and said first and second lift means for operating said first and second lift means concurrently responsive to operation of said first control means.

5. The apparatus of claim 4 in which said selectively operable coupling means comprises switch means interconnecting said second lift means and said first and second control means for connecting said second lift means to said first and second control means alternatively.

6. A deep fat fryer comprising:
(A) a housing having an upwardly facing open mouth therein,
(B) an open top tank for containing a bath of heated fat with said tank removably mounted in said open mouth of said housing for upward movement out of said housing through said mouth,
(C) two sets of lifting arms mounted on said housing adjacent to said tank with the arms of said sets mounted adjacent to opposite side walls of said tank and movable between upper and lower positions,
(D) a basket hanger mounted on each of said sets of arms above the top of said tank with the basket hangers on said two sets of arms facing toward each other for jointly supporting a food basket between them,
(E) a pair of foraminous baskets each of which has a horizontal cross sectional area less than one-half of the horizontal cross sectional area of said tank with said baskets removably mounted on said hangers, one basket on each hanger, with said baskets adapted to be lowered into said tank and raised out of said tank by said hangers responsive to movement of said sets of lift arms between said upper and lower positions,
(F) a lift motor connected to each of said sets of lift arms for reciprocating said set of lift arms between its upper and lower positions,
(G) timer control means connected to each of said lift motors for operating said electric motor independently of the other motor while controlling the time interval during which said lift motor holds its set of lift arms in said lower position, and
(H) a selectively operable switch connected to one of said motors and to both of said timer control means for selectively disconnecting one of said timer control means from both of said motors and connecting both of said motors to the other of said timer control means.

7. The deep fat fryer of claim 6 characterized further by the inclusion of a single foraminous basket having a horizontal cross sectional area which is between one-half and one times the horizontal cross sectional area of said tank with said single basket adapted to be removably mounted on and jointly supported by the basket hangers on both of said sets of lifting arms.

References Cited by the Examiner
UNITED STATES PATENTS

| | | | |
|---|---|---|---|
| 2,109,212 | 2/1938 | Ehrgott | 99—413 |
| 2,868,112 | 1/1959 | Bushway | 99—410 |
| 2,915,000 | 12/1959 | Hetzel et al. | 99—410 |

WALTER A. SCHEEL, *Primary Examiner.*